(12) United States Patent
Morris

(10) Patent No.: US 7,890,761 B1
(45) Date of Patent: Feb. 15, 2011

(54) SYSTEMS AND METHODS FOR STRONG AUTHENTICATION OF ELECTRONIC TRANSACTIONS

(75) Inventor: Michael Frank Morris, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 745 days.

(21) Appl. No.: 11/861,044

(22) Filed: Sep. 25, 2007

(51) Int. Cl.
*H04L 9/00* (2006.01)
(52) U.S. Cl. ...................................... 713/172; 713/178
(58) Field of Classification Search .................. 380/28, 380/44, 247, 286, 262; 713/170, 172, 178
See application file for complete search history.

(56) References Cited

U.S. PATENT DOCUMENTS

| | | | |
|---|---|---|---|
| 4,423,362 A * | 12/1983 | Konrad et al. ............... | 318/139 |
| 6,332,192 B1 | 12/2001 | Boroditsky et al. | |
| 6,826,696 B1 | 11/2004 | Chawla et al. | |
| 6,880,079 B2 | 4/2005 | Kefford et al. | |
| 7,194,625 B2 | 3/2007 | Cormack et al. | |
| 7,363,494 B2 * | 4/2008 | Brainard et al. ............. | 713/168 |
| 7,689,207 B2 * | 3/2010 | Hinterberger et al. ....... | 455/418 |
| 2001/0037192 A1 * | 11/2001 | Shimamoto et al. ......... | 704/8 |
| 2005/0204209 A1 * | 9/2005 | Vataja ........................ | 714/701 |
| 2006/0174104 A1 * | 8/2006 | Crichton et al. ............. | 713/155 |
| 2007/0038690 A1 * | 2/2007 | Guilford .................... | 708/200 |
| 2007/0287491 A1 | 11/2007 | Muto et al. | |

OTHER PUBLICATIONS

Mega AS Consulting Ltd.; "OTP Token"; CAT Cellular Authentication Token; p. 1 of 1; http://www.mycell.org/megaas/security/CATProductsToken.htm; Copyright Mega AS Consulting Ltd 2006.
Answers.com; "Cellular Authentication Token"; p. 1 of 1; http://www.answers.com/topic/cellular-authentication-token; Copyright © 2007 Answers Corporation.
Bitpipe.com; "CAT (Cellular Authentication Token) Demo"; Sep. 15, 2004; p. 1 of 1; http://www.bitpipe.com/detail/RES/1095236253_354.html; Copyright 2000-2007 TechTarget.
Arnnei@...; "Psst . . . I know your password: One Time Password and CAT—Cellular Authentication Token"; Jul. 6, 2004; p. 1 of 1; http://talkback.zdnet.com/5208-1009-0.html?forumID=1&threadID=795&messageID=84868&start=-9996; Copyright 2007 CNET Networks, Inc.

\* cited by examiner

*Primary Examiner*—Beemnet W Dada
(74) *Attorney, Agent, or Firm*—Brooks, Cameron & Huebsch, PLLC

(57) ABSTRACT

A token value is generated for a user to submit to an authentication service of an electronic system. The token value represents that the user is in possession of an electronic item known to the authentication service, where the electronic item is capable of two-way communications with the authentication service and has thereon an authenticator application transmitted from the authentication service to the electronic item. The authenticator application obtains a current time value from a clock of the electronic item or an authentication value from the authentication service, retrieves predetermined indicia of the electronic item from a location thereon, and combines the obtained value and the retrieved indicia of the electronic item to generate the token value. The authentication service essentially performs the same steps based on information already available at such authentication service to generate a verification token value, and compares the submitted token value to the verification token value.

21 Claims, 5 Drawing Sheets

SYSTEMS AND METHODS FOR STRONG AUTHENTICATION OF ELECTRONIC TRANSACTIONS

CROSS-REFERENCE TO RELATED APPLICATION(S)

The present application is filed concurrently with and shares a common title and disclosure with the following applications, each of which is hereby incorporated herein by reference in its entirety:
U.S. patent application Ser. No. 11/861,059; and
U.S. patent application Ser. No. 11/861,066.

FIELD

The present disclosure is directed to systems and method that may be implemented to enforce strong authentication on electronic transactions such as financial transactions that are performed on-line. More particularly, the present disclosure is directed to such systems and methods that identify a user based on knowledge possessed by the user and also based on an item known to be possessed by the user.

BACKGROUND

In most any electronic transaction, such as for example a bank transaction, a retail transaction, a data-access transaction, or the like, a user obtains access to some protected account or space or the like by way of entering a user identification (ID) and a password as authentication that the user is in fact entitled to such access. However, it is well known that employing only a password is a relatively weak method of authenticating a user. In particular, a password seldom expires and can be relatively easy to guess, especially if rules on constructing such a password are relatively weak. Moreover, even if well-constructed, a password can be stolen, and the stolen password can be widely distributed along with the corresponding user ID and used by almost anyone, perhaps with disastrous consequences for the user.

In contrast to such weak authentication, it is known to employ strong authentication by requiring submission of not only a user ID and a password, but also a token value generated by an item provided to the user. That is, such strong authentication requires something the user knows, which is the password, and something the user has, which is the item that generates the token value. Presumptively, the item is unique to the user and the token value as generated by the item of the user is unique to that item and thus cannot be generated by any other item. Also presumptively, the token value can be verified based on knowledge of the user and the item thereof. Accordingly, the token value upon being verified strongly implies that the user that provides the token value is in fact in possession of the item and correspondingly is in fact entitled to whatever access is being requested.

One such system for implementing such strong authentication is RSA SECURID two-factor authentication as marketed and provided by RSA Security Inc. of Bedford, Mass. In such RSA system, the token value is generated and displayed for each user by a small authenticator device that has been assigned to the user. In particular, such authenticator device is used only in connection with such RSA system, contains a very accurate clock and has a unique ID, and generates a new token value every minute as a one-way hash of the current minute and the unique ID. Thus, an authentication server determining whether to allow a user access to an electronic system for some sort of electronic transaction receives a user ID, a password, and a current token value from the user, and based thereon strongly authenticates the user by ensuring: (1) that the received password is correct for the received user ID, which shows that the user knows something and (2) that the received current token value is independently generated, which shows that the user has something.

In particular, and with regard to (2) above, the authentication server based on the user ID can identify the unique ID of the authenticator device that is assigned to and should be possessed by the user having such user ID, and the authentication server also has a very accurate clock. Thus, just as the authenticator device generated the received token value as a one-way hash of the current minute and the unique ID, so too does the authentication server attempt to do so. Assuming both clocks provide the same current minute value and the proper unique ID is identified, the same token value as the received current token value should be generated by the authentication server, thus resulting in a match. Of course, to allow for some drift in the current times, the authentication server may generate hashes for some number of minutes plus and minus what such authentication server has as the current minute, and any of such minutes that results in a match is accepted.

An authentication system that implements strong authentication by way of using such system-specific authenticator devices has been found to be highly secure, especially inasmuch as only that user with an assigned authenticator device having a particular unique ID can submit an acceptable token value for any particular current minute. However, it has been found that an authentication system that employs such system-specific authenticator devices is relatively expensive. In particular, such an authentication system requires extra infrastructure, both to assign the authenticator devices to the users and to keep track of the assigned authentication devices, and also to provide the accurate clocks. Also, and more significantly, the cost of such an authentication system increases for each user added to the system, especially inasmuch as each user requires his or her own authenticator device which currently costs approximately 60 USD.

Such cost may be relatively insignificant if the number of users is on the order of 100 (about 6000 USD), such as for example in an authentication system that provides access for employees of an organization to data servers of the organization over an inter-computer network such as the Internet. However, such cost can become excessive if the number of users is on the order of 1 million (about 60 million USD), such as for example in an authentication system that provides access for account holders to financial accounts at a large bank or the like over an inter-computer network such as the Internet. Moreover, such cost only increases when it is considered that the authenticator devices have to be replaced on a regular basis due to loss, damage, theft, and battery life. Further, such cost likely must be borne by the issuer of the authenticator devices and not the users, and thus can become a large budgetary expense.

Accordingly, a need exists for systems and methods for performing strong authentication in connection with an electronic system that performs electronic transactions for users, where a system-specific authenticator device need not be issued to each user of the electronic system. More particularly, a need exists for such systems and methods that employ as an authenticator device for each such user an electronic device already in possession of the user, such as for example a cellular telephone device, a paging device, a messaging device, or the like.

SUMMARY

The aforementioned needs are satisfied at least in part by a method that generates a token value for a user to submit to an authentication service of an electronic system when requesting access to the electronic system to perform an electronic transaction thereat. The token value represents that the user is in possession of an electronic item known to the authentication service, where the item is capable of two-way communications with the authentication service and has thereon a clock and an authenticator application transmitted from the authentication service to the item.

In the method, the authenticator application obtains a current time value from the clock of the item, retrieves predetermined indicia of the item from a location thereon, and combines the obtained current time value and the retrieved indicia of the item to generate the token value. The generated token value is then supplied to a location on the item for being submitted therefrom to the authentication service by the user. Alternatively, instead of the current time value, the authenticator application obtains an authentication value from the authentication service.

In either case, the authentication service essentially performs the same steps based on information already available at such authentication service to generate a verification token value and compares the submitted token value to the verification token value. If the token values match, the authentication service allows the user the requested access.

BRIEF DESCRIPTION OF THE DRAWINGS

The foregoing summary, as well as the following detailed description of various embodiments of the present invention, will be better understood when read in conjunction with the appended drawings. For the purpose of illustrating the embodiments, there are shown in the drawings embodiments which are presently preferred. As should be understood, however, the embodiments of the present invention are not limited to the precise arrangements and instrumentalities shown. In the drawings.

DETAILED DESCRIPTION

Example Computing Environment

Figure 1:
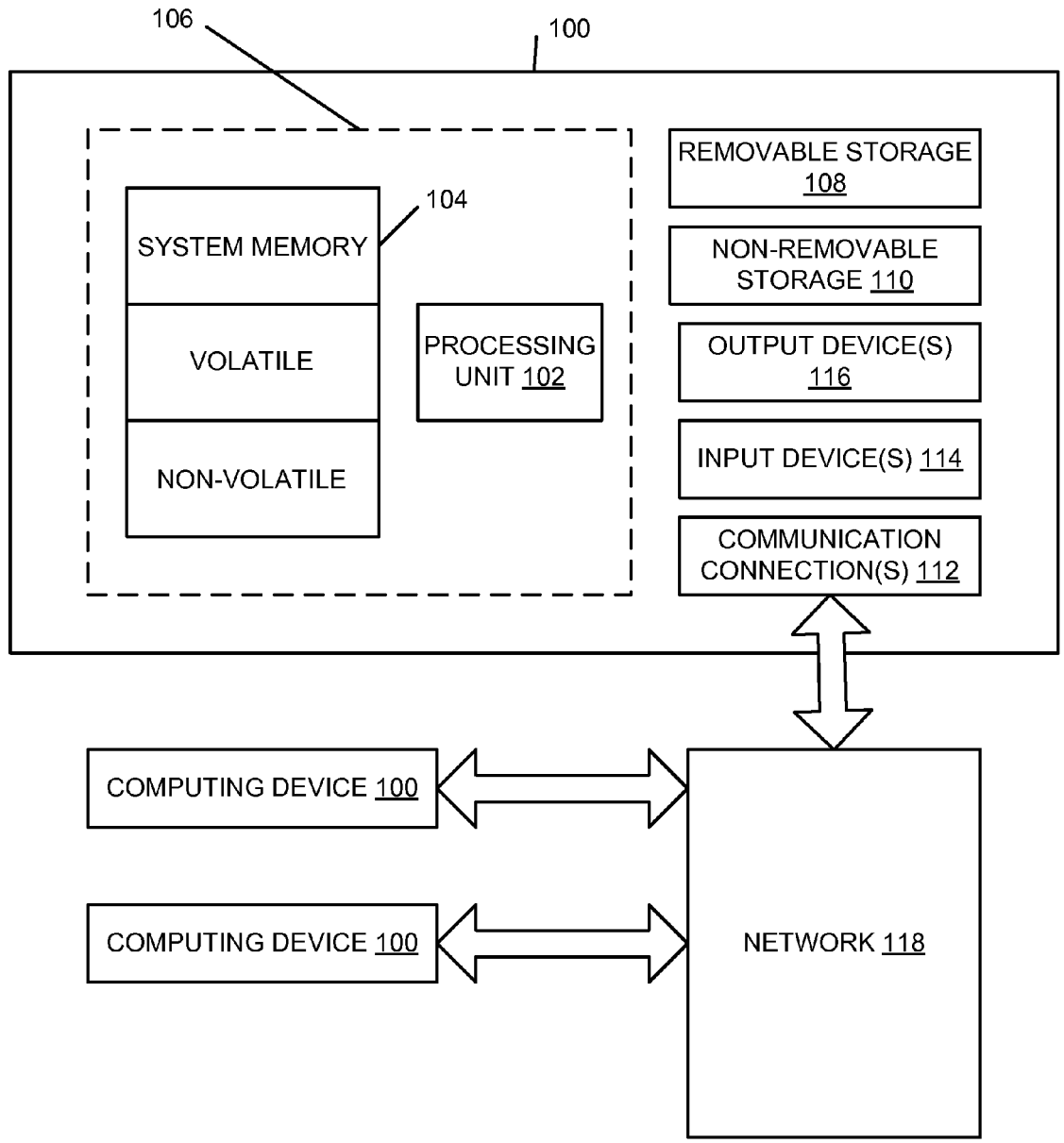
FIG. 1 is a block diagram of an example of a computing environment within which various embodiments of the present invention may be implemented.

FIG. 1 is set forth herein as an exemplary computing environment in which various embodiments of the present invention may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 6 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Electronic Transactions

Figure 2:
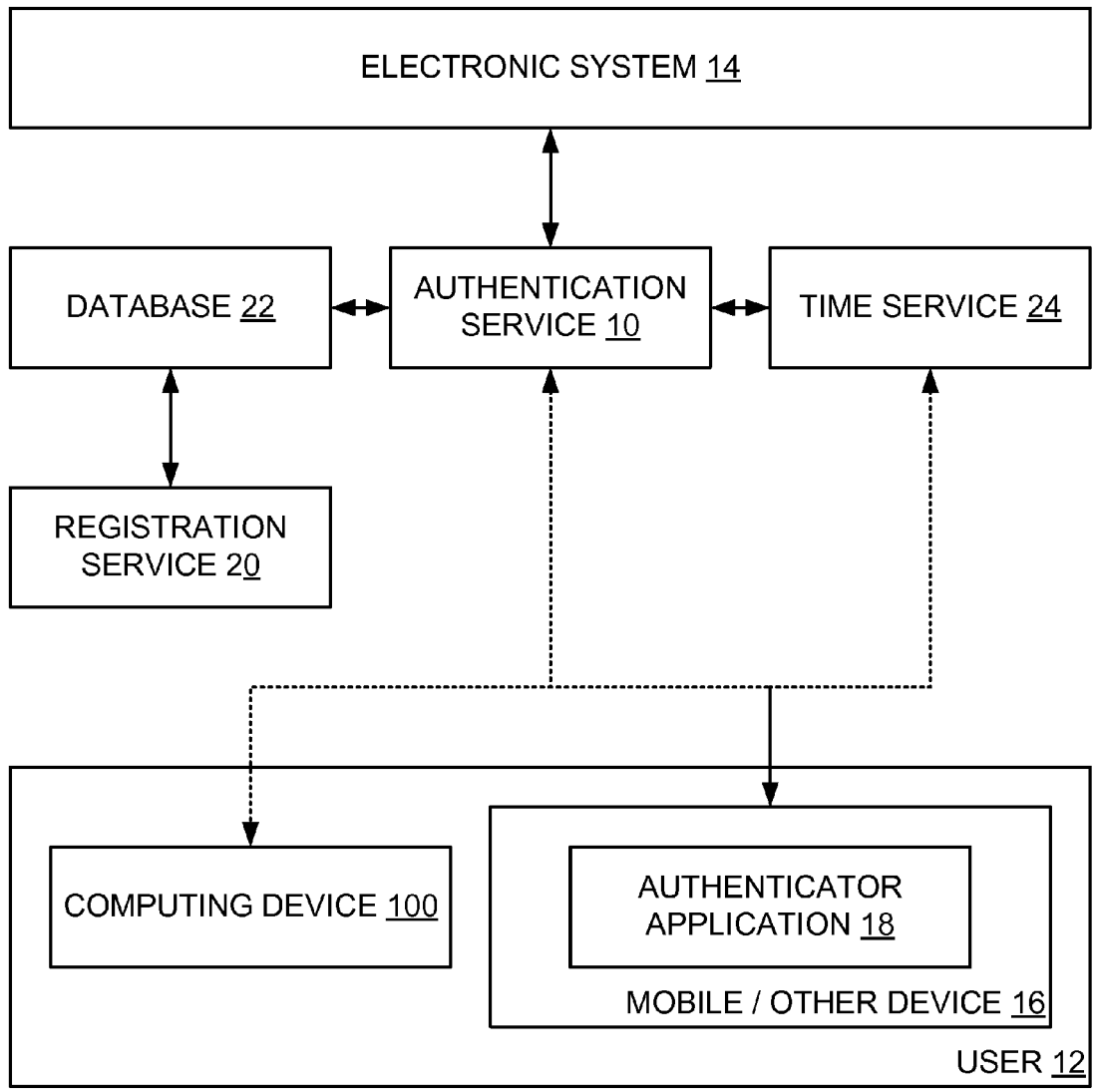
FIG. 2 is a block diagram of a mobile of a user with an authenticator application that generates an authorization token value for presentation by the user to an authentication service of an electronic system in accordance with various embodiments of the present invention.

Turning now to FIG. 2, it is seen that in various embodiments of the present invention, strong authentication is provided by an authentication service 10 to a user 12 to allow the user 12 to perform one or more electronic transactions in connection with an electronic system 14 associated with the authentication service 10. The authentication service 10 may be any appropriately constructed authentication service and may employ any appropriate equipment and functions without departing from the spirit and scope of the present invention, as long as the authentication service 10 is performing strong authentication generally in the manner set forth herein. Thus, the authentication service 10 may for example be implemented as a server or the like that is associated with the electronic system 14, perhaps at the so-called front end thereof.

The electronic transactions, the user 12, and the electronic system 14 may generally be any electronic transaction that could be performed by any type of user 12 in connection with any type of electronic system 14, again without departing from the spirit and scope of the present invention, as long as the electronic transaction is deemed to require strong authentication. For example, the electronic system 14 could be a banking system, in which case the electronic transactions could be financial transactions; the electronic system 14 could be a retail purchasing system, in which case the electronic transactions could be retail purchases; the electronic system 14 could be a server network of an organization accessed by employees of the organization, in which case the electronic transactions could be accessing documents, content, and/or data within the server network; etc.

It is expected that each user 12 attempting to gain access to an electronic system 14 to perform an electronic transaction thereat is typically a human user, although the user 12 may also be a non-human user, such as for example a computer or another electronic system, without departing from the spirit and scope of the present invention. Typically, the user 12 would be expected to access the electronic system 14 by way of the authentication service 10 through an inter-network data communications system such as the Internet or the like. However, alternate access may be achieved without departing from the spirit and scope of the present invention. For example, such alternate access may be achieved by way of an automated transaction machine or the like that has a dedicated communicative coupling to the authentication service 10/electronic system 14.

Strong Authentication

As was alluded to above, in weak authentication, a user 12 gains access to an electronic system 14 by submitting a user ID and a password. However, and again, passwords are vulnerable for many reasons, and once disclosed may be widely distributed and used, perhaps with disastrous consequences. Accordingly, and as is generally known by the relevant public, strong authentication requires submission of a user ID to identify the user 12, a password to show something the user 12 knows, and a token value to show that the user has an item 16 that generates the token value. Presumptively, and again, the item 16 is unique to the user and the token value can only be generated by that item 16 and not by any other item 16. Also presumptively, the token value can be verified based on knowledge of the user 12 and the item 16 thereof. Accordingly, the token value upon being verified strongly implies that the user 12 that provides the token value is in fact in possession of the item 16, and correspondingly is in fact entitled to whatever access is being requested.

In the prior art, and as was set forth above, the item 16 was typically a system-specific authenticator device that was specifically designed for use in connection with authenticating to a particular authentication service 10, and that therefore was typically supplied to each user 12 at a relatively high cost per device 16. In various embodiments of the present invention, however, it has been recognized that each user 12 is typically already in possession of an electronic device that could function as the item 16, namely a cellular telephone device, a paging device, a messaging device, or the like. As should be understood based on the following, most any one- or two-way communications device may be employed as the item 16 without departing from the spirit and scope of the present invention, presuming of course that the device as the item 16 can be configured to provide a verifiable token value that is unique to such device and that cannot be easily spoofed or otherwise falsely constructed.

Notably, a cellular/mobile telephone device is especially useful as the item 16, particularly inasmuch as the cellular telephone device is uniquely identifiable in the manner that cannot easily be spoofed. Specifically, such a cellular telephone device has a unique telephone number associated therewith, and also has a unique network ID for use within a cellular telephone network. In addition, a cellular telephone device is a two-way communications device and thus can not only send but receive data, including data from the authentication service 10, as will be set forth in more detail below. Of course, other uniquely identifiable devices and/or two-way communications devices may also be employed as the item 16 without departing from the spirit and scope of the present invention, such as for example a two-way messaging and/or electronic mail device. One-way communications devices may also be employed as the item 16 in at least some circumstances.

In various embodiments of the present invention, the item 16 be it a cellular/mobile telephone device or otherwise (hereinafter, 'mobile 16') includes the capability to load and run various applications, including an authenticator application 18 for performing functions at the mobile 16 such as those set forth herein. As may be appreciated, most current mobiles 16 include such a capability and requiring same is therefore not believed to be onerous or burdensome.

Registering Mobile 16 at Service 10

In order to access the electronic system 14 by way of the authentication service 10 to perform an electronic transaction, the user 12 first registers the mobile 16 thereof to such authentication service 10 to identify such mobile 16 to such authentication service 10. Note here that the authentication service 10 may perform the registration itself, may include a registration service therein to effectuate same (not shown), or may employ an external registration service 20 to effectuate same (shown), all without departing from the spirit and scope of the present invention.

Registering the mobile 16 may be performed by way of a human intermediary, such as a telephone operator, without departing from the spirit and scope of the present invention. However, doing so on a large scale may be prohibitively expensive and accordingly it may be more expedient and cost-effective to register the mobile 16 in the form of an on-line electronic transaction.

Figure 3:
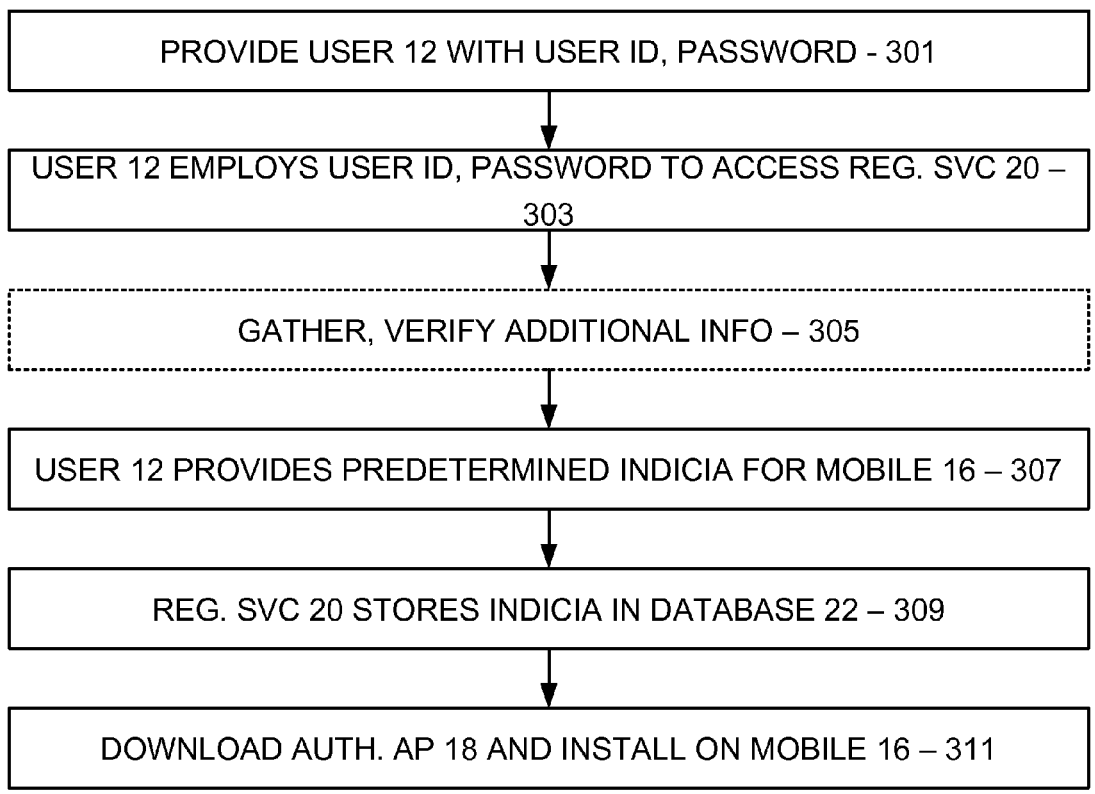
FIG. 3 is a flow diagram showing key steps performed when registering the mobile of FIG. 2 to the authorization service in accordance with various embodiments of the present invention.

Turning now to FIG. 3, then, to register the mobile 16 for a user 12 in the form of such an electronic transaction, and in various embodiments of the present invention, the user 12 is provided with a user ID and a password in a generally known manner (step 301), and employs same to obtain access to the registration service 20 (step 303). Admittedly, accessing such registration service 20 by way of only such user ID and password constitutes weak authentication, and accordingly additional verifying information should be gathered and verified to impart additional strength to such weak authentication (step 305). For example, such additional verifying information could include identifying indicia already associated with the user 12 at the electronic system 14, such as an address, an identifying value, previously established security phrases, and the like.

At any rate, once a satisfactory level of authentication has been achieved, the user 12 provides predetermined identifying indicia for the mobile 16 to the registration service 20 (step 307). Such predetermined indicia may be the telephone number associated with the mobile 16 and/or the network ID of the mobile 16, among other things, without departing from the spirit and scope of the present invention. Notably, such indicia should be values available to the authenticator application 18 on the mobile 16, and also values that are not easily modifiable by a nefarious entity that would attempt to spoof the indicia on another mobile 16 or that would attempt to improperly change such indicia on that mobile 16.

At any rate, the registration service 20 upon being provided with such indicia for the mobile 16 stores same in a database 22 (FIG. 2) or the like that is accessible by the authentication service 10 (step 309). As may be appreciated, such database 22 can be any database and in any appropriate form without departing from the spirit and scope of the present invention. For example, it may be that the database 22 already has the user ID and password for the user 12 and was referenced when access to the registration service 20 was obtained, in which case the indicia may be stored along with the user ID and password for the user 12 in an appropriately formatted entry therefor.

Note here that the aforementioned authenticator application 18 must at some point be downloaded to and installed on the mobile 16 (step 311). Such downloading and installing may take place in any appropriate manner without departing from the spirit and scope of the present invention. For example, if the registration process of FIG. 3 is performed by the user 12 through a browser or the like on the mobile 16, the registration service 20 may download the authenticator application 18 to the mobile 16 by way of the browser and during successful completion of the registration process. Alternatively, upon successful completion of the registration process or at another time, the registration service 20 or another service may send the authenticator application 18 to the mobile by way of an electronic mail message or the like.

Generating Token Value at Mobile 16

In various embodiments of the present invention, the token value is generated and displayed by a registered mobile 16 in the following manner. Preliminarily, and referring now to FIG. 4, it is to be appreciated that the authenticator application 18 must be running on the mobile 16 (step 401). Thus, such application 18 may be running continuously on the mobile 16 or the user 12 may actuate such application 18 on the mobile 16. In either case, it is also to be appreciated that the generated token value should be based on the correct current time, and accordingly the application 18 on the mobile 16 periodically sends out a message by way of the communications facilities of the mobile 16 to a time service 24 and receives therefrom such correct time (step 403). As may be appreciated, such time service 24 may be associated with the authentication service 10 or may be independent therefrom. Assuming that the mobile 16 has a clock of its own with a fair degree of accuracy, such clock is updated with the received correct time as the current time (step 405), in which case the step of receiving the correct time may be performed only periodically and not necessarily when generating each token value. Of course, the current time as maintained on the clock of the mobile 16 is allowed to accumulate so as to be relatively accurate.

At any rate, to generate a particular token value, the authenticator application 18 retrieves the current time from the clock of the mobile 16 and also retrieves the aforementioned predetermined indicia of the mobile 16 therefrom (step 407), and combines same in some manner that is not easily spoofed or otherwise reproduced by a nefarious entity or the like. For example, the retrieved current time and indicia may be hashed, perhaps along with other data, to result in the token value (step 409). Such hash may be performed by the application 18 in any known manner without departing from the spirit and scope of the present invention. For example, the hash may be a one-way hash function, such as for example a SHA-1 or SHA-256 hash function. Notably, the combination or hash must be reproducible by the authentication service 10, as will be set forth in more detail below.

The token value as generated may then be displayed by the authenticator application 18 to the user 12 by way of a display on the mobile 16 (step 411a), and the user 12 may employ same to access the electronic system 14 to perform an electronic transaction in the manner set forth below. Alternatively, if the user 12 is employing a browser or the like on the mobile 16 to perform the electronic transaction at the electronic system 14, such application 18 may supply the generated token value to an appropriate location on the mobile 16 for use in connection with the authentication service 10 of the electronic system 14 (step 411b).

Note that the use of the current time to generate the token value allows the generated token value to vary over time in a manner that can be reproduced. However, other values may be employed while still allowing the generated token value to vary over time in a manner that can be reproduced. In particular, and bearing in mind that the mobile 16 in particular is a two-way communications device, such value may be a varying value as obtained from the authentication service 10 or a related service (not shown). More specifically, and in one embodiment of the present invention, to generate the token value, the authenticator application 18 may obtain an authentication value from the authentication service 10 or a related entity (hereinafter, 'the authentication service 10') and employ same instead of the current time.

Figure 4:
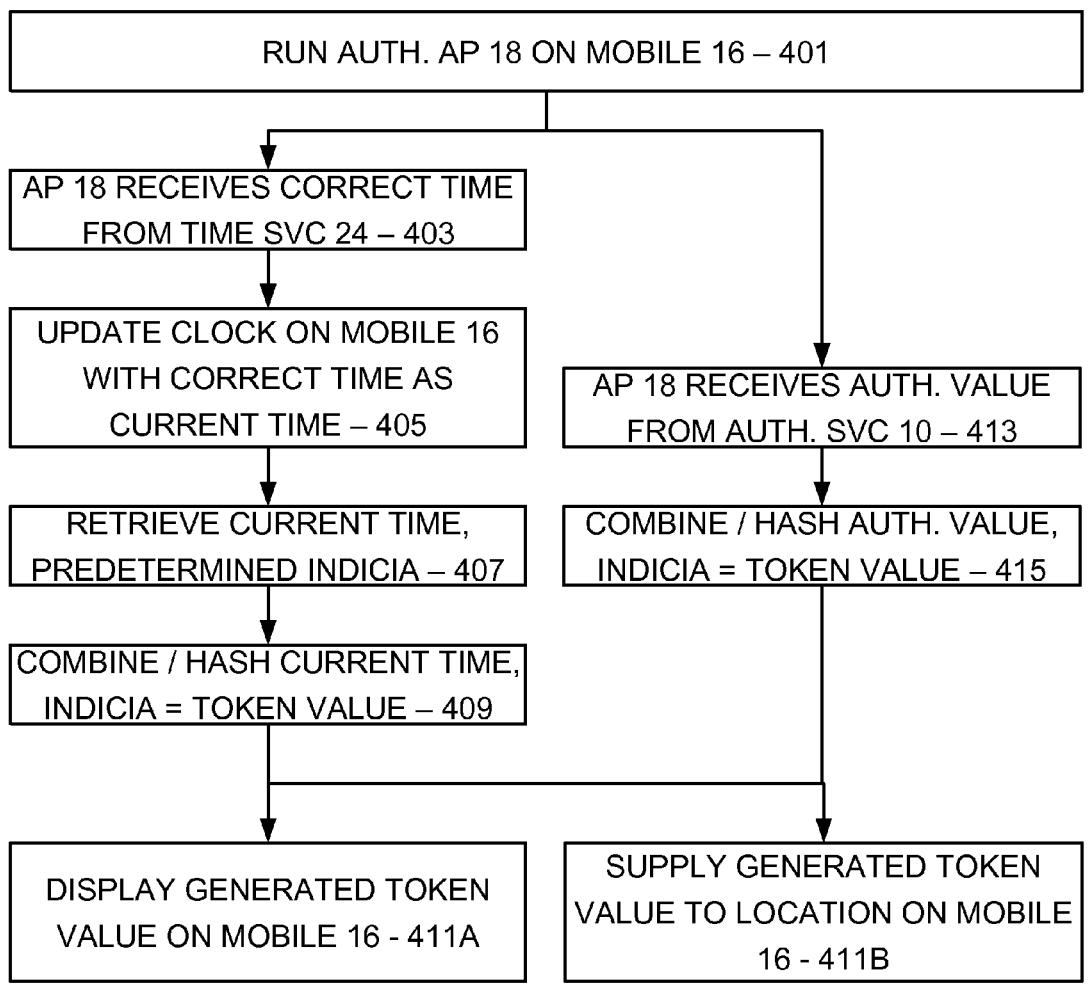
FIG. 4 is a flow diagram showing key steps performed when the registered mobile of FIG. 2 generates the token value in accordance with various embodiments of the present invention.

In such a situation, and still referring to FIG. 4, after the authenticator application 18 is actuated on the mobile 16 as at step 401, such application 18 sends out a message by way of the communications facilities of the mobile 16 to the authentication service 10 and in response thereto receives the authentication value (step 413). As may be appreciated, such authentication value can be any appropriate value without departing from the spirit and scope of the present invention. For example, the authentication value can be a randomized value which the authentication service 10 will accept for a relatively short period of time. Of course, such authentication service 10 must record the authentication value as being associated with the user 12, or at least the mobile 16 of the user 12, and may do so in the database 22 or the like, perhaps based on the authenticator application 18 including the identifying indicia of the mobile 16 with the message of step 413.

At any rate, with the received authentication value, the authenticator application 18 proceeds in a similar manner as before by combining the received authentication value and the predetermined indicia of the mobile 16 in some manner that is not easily spoofed or otherwise reproduced by a nefarious entity or the like. For example, and again, such authentication value and indicia may be hashed, perhaps along with other data, to result in the token value (step 415). Again, the combination or hash must be reproducible by the authentication service 10, as will be set forth in more detail below. Thereafter, and as before, the token value as generated is either displayed as at step 411a or supplied to an appropriate location on the mobile 16 as at step 411b.

Verifying Generated Token Value at Service 10

As was set forth above, upon the token value being generated, such generated token value is presented to the authentication service 10 to authenticate the user 12 and allow such user 12 to access the electronic system 14 to conduct an electronic transaction thereat. As set forth below, the authentication service 10 employs the received token value as representing something the user has, namely the registered mobile 16 of such user 12, presuming that the received token value can be verified.

Figure 5:
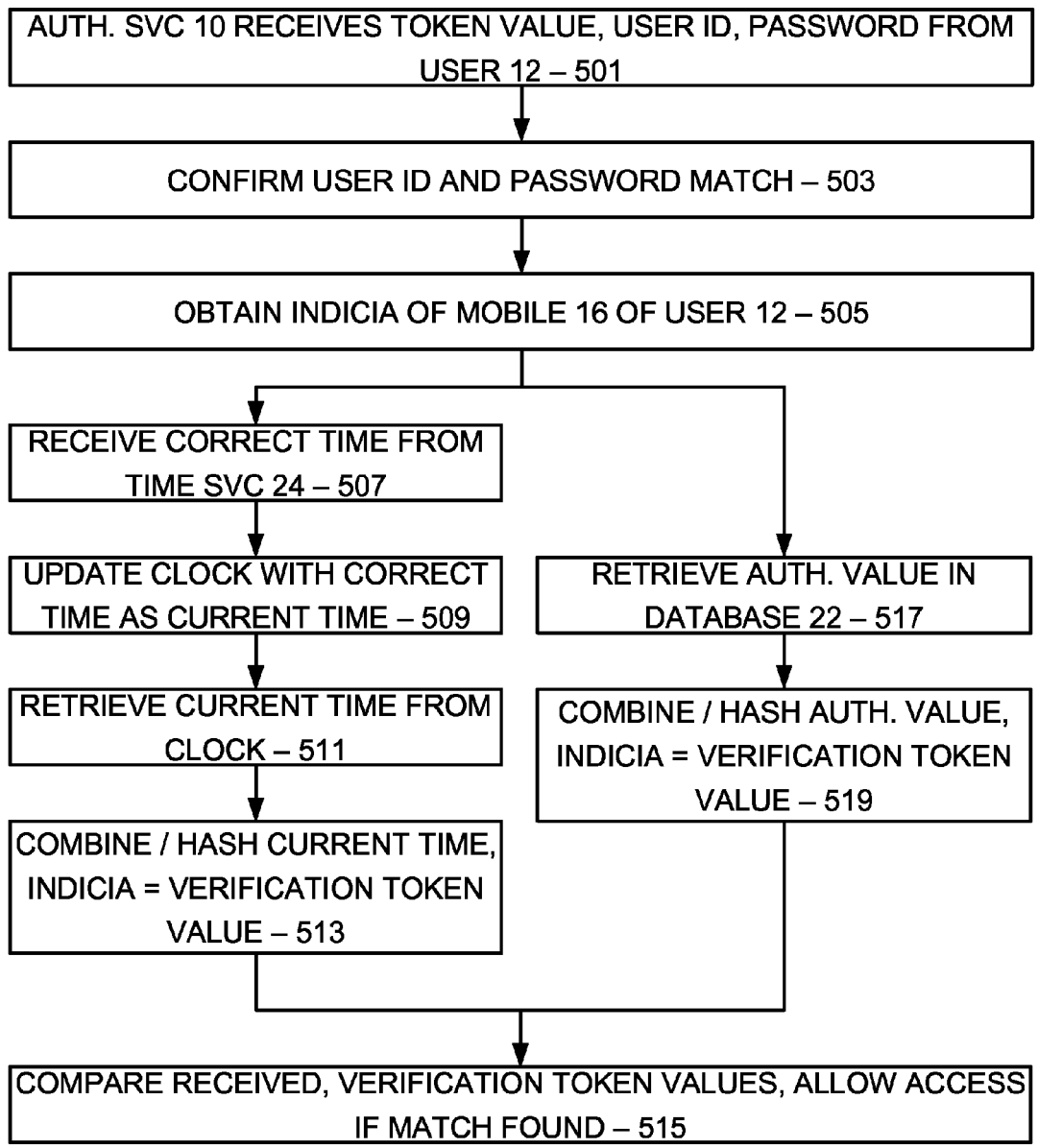
FIG. 5 is a flow diagram showing key steps performed when the authorization service of FIG. 2 verifies the generated token value in accordance with various embodiments of the present invention.

Generally, and referring now to FIG. 5, the user 12 submits the generated token value, a user ID, and a password (i.e. something the user knows) either by way of a browser or the like on the mobile 16 or on another computing device 100 such as a personal computer or the like, or even at some sort of an automated transaction machine (step 501), and the authentication service 10 upon receiving same first confirms that the user ID and password match (step 503), presumptively based on information available in the database 22. Also based on such information in the database 22, the authentication service 10 may at least tentatively identify the user 12, and more importantly obtain the indicia of the mobile 16 of the tentatively identified user 12 (step 505).

In embodiments of the present invention wherein the token value is derived from a current time, the authentication service proceeds by essentially reproducing the steps that the authenticator application 18 on the mobile 16 employed to generate the token value. That is, the authentication service 10 periodically sends out a message to a time service 24 and receives therefrom the correct time (step 507). Again, assuming that the authentication service 10 has a clock of its own with a fair degree of accuracy, such clock is updated with the received correct time as the current time (step 509), in which case the step of receiving the correct time may be performed only periodically and not necessarily when verifying each token value. Of course, and again, the current time as maintained on the clock of the authentication service 10 is allowed to accumulate so as to be relatively accurate.

At any rate, to validate the received token value, the authentication service 10 retrieves the current time from the clock thereof (step 511), and with the indicia of the mobile 16 as obtained from the database 22, combines both in the same manner as was performed by the authenticator application 18 at the mobile 16. For example, the retrieved current time and indicia again may be hashed, perhaps along with other data, to result in a verification token value (step 513). As may now be appreciated, the received token value is then compared by the authentication service 10 with the verification token value, and if a match is found, the access by the user 12 is allowed by such authorization service 10 (step 515). Otherwise, access is denied. Note here, that, as was set forth above, to allow for some drift in the current times, the authentication service 10 may generate hashes for some number of time values plus and minus what such authentication service 10 has as the current time value, and any of such time values that results in a match is accepted.

In embodiments of the present invention wherein the token value is derived from an authentication value, the authentication service also proceeds by essentially reproducing the steps that the authenticator application 18 on the mobile 16 employed to generate the token value in this regard. That is, the authentication service 10 retrieves the authentication value as was recorded in the database 22 or the like (step 517), and combines the retrieved authentication value and the predetermined indicia of the mobile 16 in the same manner as was performed by the authenticator application 18 at the mobile 16. For example, and again, such authentication value and indicia may be hashed, perhaps along with other data, to result in the verification token value (step 519). Thereafter, and as before, the received token value is then compared by the application service 10 with the verification token value, and if a match is found, the access by the user 12 is allowed by the authorization service 10 as at step 515.

Other Embodiments

As may be appreciated, if the generated token value based on the indicia and the current time from a clock or the authentication value from the authentication service 10 is considered to be strong, then the generated token value based on the indicia and both the current time from a clock and the authentication value from the authentication service 10 is considered to be stronger. Accordingly, in various embodiments of the present invention, the generated token value is some combination of the indicia, the current time from a clock, and an authentication value from the authentication service 10. Methods and systems for employing such a stronger token value should be evident from the disclosure as set forth above, and therefore need not be set forth herein in any detail.

In the embodiments where an authentication value is provided by the authentication service 10, such authentication value may be requested or 'pulled' by the authenticator application 18 on the mobile 16, or may be sent or 'pushed' to the authenticator application 18 on the mobile 16 without such application 18 specifically requesting same. In either instance, the transmission protocol may be any appropriate protocol without departing from the spirit and scope of the present invention.

In any embodiment where the authenticator application 18 makes a request for data or provides data to the authentication service 10 or the like, it is incumbent that the authenticator application 18 should assert trustworthiness. To do so, it may be that case that the transmission from the application 18 is digitally signed based on a digital certificate that is recognizable by the service 10. Use of such digital signatures and certificates is known or should be apparent to the relevant public and therefore need not be set forth herein in any detail.

CONCLUSION

The programming believed necessary to effectuate the processes performed in connection with the various embodiments of the present invention is relatively straight-forward and should be apparent to the relevant programming public. Accordingly, such programming is not attached hereto. Any particular programming, then, may be employed to effectuate the various embodiments of the present invention without departing from the spirit and scope thereof.

In the present invention, systems and methods are provided for performing strong authentication in connection with an electronic system 14 that performs electronic transactions for users 12, where a system-specific authenticator device need not be issued to each user 12 of the electronic system 14. Instead, such systems and methods employ as an authenticator device for each such user 12 an electronic device already in possession of the user 12 such as the mobile 16 thereof.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method of generating a token value for a user to submit to an authentication service of an electronic system when requesting access to the electronic system to perform an electronic transaction thereat, the token value representing that the user is in possession of an electronic item known to the authentication service, the electronic item having thereon an authenticator application transmitted from the authentication service to the electronic item, the method comprising the authenticator application:

obtaining an authentication nonce comprising at least one of an authentication value from the authentication service and a current time value from a clock on the electronic item;
    wherein obtaining the current time value further comprises sending a message by way of the electronic item to a time service, receiving therefrom a correct time, and updating the clock of the electronic item with such received correct time, the current time value representing an accumulation of time based on such received correct time;

retrieving predetermined indicia of the electronic item from a location thereon;

combining the obtained authentication nonce and the retrieved indicia of the electronic item to generate the token value; and supplying the generated token value to a location on the electronic item for being submitted therefrom to the authentication service by the user.

2. The method of claim 1 wherein obtaining the authentication value further comprises sending a message by way of the electronic item to the authentication service, the message including the retrieved indicia of the electronic item, and receiving therefrom the authentication value in response, the authentication service having recorded the authentication value as being associated with the electronic item.

3. The method of claim 1 wherein the electronic item is a cellular mobile telephone of the user, the cellular mobile telephone being registered with the authentication service.

4. The method of claim 3 wherein the predetermined indicia of the electronic item is at least one of a network 10 of the cellular mobile telephone and a telephone number associated with the cellular mobile telephone.

5. The method of claim 1 comprising hashing the obtained authentication nonce and the retrieved indicia of the electronic item according to a one-way hash function known to the authentication service to form the token value.

6. The method of claim 1 wherein supplying the generated token value to a location on the electronic item comprises one of displaying the generated token value on a display of the electronic item and supplying the generated token value to a storage location of the electronic item for retrieval to a browser instantiated on the electronic item.

7. The method of claim 1 further comprising the user registering the electronic item to the authentication service, including sending the indicia of the electronic item to the authentication service and receiving at the electronic item transmission of the authenticator application from the authentication service.

8. A non-transitory computer-readable medium having computer-executable instructions thereon for performing a method of generating a token value for a user to submit to an authentication service of an electronic system when requesting access to the electronic system to perform an electronic transaction thereat, the token value representing that the user is in possession of an electronic item known to the authentication service, the electronic item having thereon an authenticator application transmitted from the authentication service to the electronic item, the method comprising the authenticator application:
obtaining an authentication nonce comprising at least one of an authentication value from the authentication service and a current time value from a clock on the electronic item;
wherein obtaining the current time value further comprises sending a message by way of the electronic item to a time service, receiving therefrom a correct time, and updating the clock of the electronic item with such received correct time, the current time value representing an accumulation of time based on such received correct time
retrieving predetermined indicia of the electronic item from a location thereon;
combining the obtained authentication nonce and the retrieved indicia of the electronic item to generate the token value; and
supplying the generated token value to a location on the electronic item for being submitted therefrom to the authentication service by the user.

9. The medium of claim 8 wherein obtaining the authentication value further comprises sending a message by way of the electronic item to the authentication service, the message including the retrieved indicia of the electronic item, and receiving therefrom the authentication value in response, the authentication service having recorded the authentication value as being associated with the electronic item.

10. The medium of claim 8 wherein the electronic item is a cellular mobile telephone of the user, the cellular mobile telephone being registered with the authentication service.

11. The medium of claim 10 wherein the predetermined indicia of the electronic item is at least one of a network 10 of the cellular mobile telephone and a telephone number associated with the cellular mobile telephone.

12. The medium of claim 8 wherein the method comprises hashing the obtained authentication nonce and the retrieved indicia of the electronic item according to a one-way hash function known to the authentication service to form the token value.

13. The medium of claim 8 wherein supplying the generated token value to a location on the electronic item comprises one of displaying the generated token value on a display of the electronic item and supplying the generated token value to a storage location of the electronic item for retrieval to a browser instantiated on the electronic item.

14. The medium of claim 8 wherein the method further comprises the user registering the electronic item to the authentication service, including sending the indicia of the electronic item to the authentication service and receiving at the electronic item transmission of the authenticator application from the authentication service.

15. A system for generating a token value for a user to submit to an authentication service of an electronic system when requesting access to the electronic system to perform an electronic transaction thereat, the token value representing that the user is in possession of an electronic item known to the authentication service, the electronic item having thereon an authenticator application transmitted from the authentication service to the electronic item, the system with regard to the authenticator application having a processor and memory in a computing apparatus that:
obtains an authentication nonce comprising at least one of an authentication value from the authentication service and a current time value from a clock on the electronic item;
wherein the processor and memory in a computing apparatus that obtains the current time value further comprises a processor and memory in a computing apparatus that sends a message by way of the electronic item to a time service, a processor and memory in a computing apparatus that receives therefrom a correct time, and a processor and memory in a computing apparatus that updates the clock of the electronic item with such received correct time, the current time value representing an accumulation of time based on such received correct time;
retrieves predetermined indicia of the electronic item from a location thereon;
combines the obtained authentication nonce and the retrieved indicia of the electronic item to generate the token value; and
supplies the generated token value to a location on the electronic item for being submitted therefrom to the authentication service by the user.

16. The system of claim 15 wherein the processor and memory in a computing apparatus that obtains the authentication value further comprises a processor and memory in a computing apparatus that sends a message by way of the electronic item to the authentication service, the message including the retrieved indicia of the electronic item, and a processor and memory in a computing apparatus that receives therefrom the authentication value in response, the authentication service having recorded the authentication value as being associated with the electronic item.

17. The system of claim 15 wherein the electronic item is a cellular mobile telephone of the user, the cellular mobile telephone being registered with the authentication service.

18. The system of claim 17 wherein the predetermined indicia of the electronic item is at least one of a network 10 of the cellular mobile telephone and a telephone number associated with the cellular mobile telephone.

19. The system of claim 15 comprising a processor and memory in a computing apparatus that hashes the obtained authentication nonce and the retrieved indicia of the electronic item according to a one-way hash function known to the authentication service to form the token value.

20. The system of claim 15 wherein the processor and memory in a computing apparatus that supplies the generated token value to a location on the electronic item comprises one of a processor and memory in a computing apparatus that displays the generated token value on a display of the electronic item and a processor and memory in a computing apparatus that supplies the generated token value to a storage location of the electronic item for retrieval to a browser instantiated on the electronic item.

21. The system of claim 15 further comprising a processor and memory in a computing apparatus that allows the user to register the electronic item to the authentication service, including sending the indicia of the electronic item to the authentication service and receiving at the electronic item transmission of the authenticator application from the authentication service.

* * * * *